United States Patent [19]
Bailey et al.

[11] Patent Number: 5,859,293
[45] Date of Patent: Jan. 12, 1999

[54] HIGH PURITY CARNOSIC ACID FROM ROSEMARY AND SAGE EXTRACTS BY PH-CONTROLLED PRECIPITATION

[75] Inventors: David T. Bailey, Boulder; Steven L. Richheimer, Westminster; Virginia R. Bank; Benjamin T. King, both of Boulder, all of Colo.

[73] Assignee: Hauser, Inc., Boulder, Colo.

[21] Appl. No.: 892,046

[22] Filed: Jul. 14, 1997

Related U.S. Application Data

[62] Division of Ser. No. 434,361, May 5, 1995, abandoned.

[51] Int. Cl.⁶ .................................................. C07C 63/34
[52] U.S. Cl. ........................................... 562/467; 562/466
[58] Field of Search ...................................... 562/467, 466

[56] References Cited

FOREIGN PATENT DOCUMENTS

| | | |
|---|---|---|
| 480077 | 4/1992 | European Pat. Off. . |
| 582318 | 2/1994 | European Pat. Off. . |
| 717925 | 6/1996 | European Pat. Off. . |
| 728420 | 8/1996 | European Pat. Off. . |

OTHER PUBLICATIONS

Tena, M. T et al, Anal. Chem (1997) 69(3) 521–526.
Nguyen, U et al, Supercrit Fluid Process. Food Biomater. (1994).

*Primary Examiner*—Paul J. Killos
*Attorney, Agent, or Firm*—Chrisman, Bynum & Johnson; Steven C. Petersen

[57] ABSTRACT

A process for the extraction and isolation of concentrated carnosic acid from plant matter of the Labiatae family including contacting the plant matter with a water-miscible solvent to form a plant extract and adjusting the pH of the plant extract to a level between 7 and 10 while adding water in an amount sufficient to cause precipitation of impurities while retaining the carnosic acid salt in solution. The impurities are separated and the remaining aqueous solution is acidified to precipitate a highly purified carnosic acid product which is essentially odorless, flavorless and colorless.

33 Claims, 1 Drawing Sheet

(CARNOSIC ACID)

(ROSMANOL)

HIGH PURITY CARNOSIC ACID FROM ROSEMARY AND SAGE EXTRACTS BY PH-CONTROLLED PRECIPITATION

This application is a divisional of Ser. No. 08/434,361 filed May 5, 1995 now abandoned.

BACKGROUND OF THE INVENTION

This invention relates generally to the field of preparing antioxidants from naturally occurring plant materials, i.e, *Rosmarinus officinalis* ("rosemary") and *Salvia officinalis* ("sage"). The process of this invention produces carnosic acid (See FIG. 1) of high purity.

Antioxidants serve in a number of important commercial applications, especially as ingredients in food products susceptible to degeneration, in one form or another, due to oxidation. "Antioxidants" are defined by the Food and Drug Administration (21 CFR § 170.3) as "substances used to preserve food by retarding deterioration, rancidity, or discoloration due to oxidation." Commercial applications include use in processed meat and poultry, salad dressings, seasonings, snacks, nuts, soup bases, edible fats and oils, natural foods, pet foods and packaging. In addition to foods, antioxidants have been used to prevent oxidation in various cosmetic and toiletry products and in medicinal or pharmaceutical preparations. The primary purpose in each of these applications is to prevent deterioration of desirable product characteristics by inhibiting oxidation.

More recently, antioxidants in food sources and dietary supplements have received attention for their potential to prevent or delay the onset of certain cancers and other chronic health conditions including heart disease, cataracts and aging. The theory is that, by preventing oxidation, these materials inhibit the formation of oxygen containing free radicals that are believed to play a significant role in initiation of these conditions and other chronic disorders.

The use of spices to prevent food deterioration as well as to impart flavor has been known for centuries. Because of their cost and availability, however, synthetic antioxidants, such as butyl hydroxyanisole ("BHA") and butylated hydroxytoluene ("BHT"), have been predominant in commercial food preparation. These antioxidants have proven quite effective. However, significant questions have been raised about their safety. For example, BHA has been identified as a "carcinogen" by the International Agency for Research on Cancer and has been banned in Europe. The safety of BHT has also been questioned.

Because of these concerns, there has been an increasing interest in the use of naturally occurring antioxidants in food preparation. These include various phenolic diterpenes, such as carnosic acid which is found in and can be isolated from certain spices, particularly rosemary and sage. Recent tests indicate that carnosic acid is significantly more effective than other naturally occurring antioxidants, as well as certain synthetic antioxidants, such as BHA and BHT. Antioxidants prepared from rosemary or sage extracts have certain additional advantages including the fact that they are stable at high temperatures compared to other antioxidants. As a result carnosic acid has a greater "carry-through" in commercial food preparation processes. In addition, carnosic acid is readily soluble in oil. Apart from its superior characteristics as an antioxidant, many consumers perceive that naturally occurring antioxidants, such as carnosic acid, are inherently safer than synthetic "preservatives."

Unfortunately, antioxidants extracted from naturally occurring materials also exhibit flavors, odors and colors that are undesirable in many applications. Accordingly, significant efforts have been expended to find commercially acceptable ways to extract antioxidants from these plant sources and to separate them from other naturally occurring compounds that give rise to these undesirable characteristics. Many processes have been tried, but suffer from various defects, such as cost, lack of selectivity in isolating the antioxidant, or poor yield.

SUMMARY OF THE INVENTION

We have now discovered an improved process for isolating and concentrating carnosic acid from plant materials, such as rosemary and sage. The process produces highly concentrated carnosic acid which is essentially odorless, flavorless and colorless.

In general, we have found that carnosic acid can be isolated utilizing a water-miscible solvent, such as acetone, to extract that material from the plant followed by a pH-controlled precipitation in the presence of water as a forcing solvent. Carnosic acid has poor solubility in water; however, some salts of carnosic acid are significantly more water soluble. Therefore, base is added to the extract to deprotonate the carnosic acid and make the carnosic acid salt. The water content of the extract is then adjusted to a level such that many component molecules are insoluble, but the carnosic acid salt is soluble, resulting in the precipitation of substantial impurities. The impurities are removed by appropriate means, and the carnosic acid salt remains in solution. The solution is then subjected to a distillation treatment such as vacuum steam distillation to evaporate part of the solvent. The natural oils that cause the odor and taste characteristic of the spice are removed during this steam distillation as they are dissipated along with the steam. The solution is then acidified causing the purified carnosic acid product to precipitate and allowing the product to be recovered by appropriate means, such as, filtration or centrifugation.

The process of this invention is different from and superior to prior art processes for isolating antioxidants from rosemary or sage in which a base has been employed. This prior art consists of two types. The first includes processes in which plant extraction is attempted with an aqueous base. See, for example, U.S. Pat. No. 4,012,531. The second includes liquid/liquid extraction with a base. See, for example, U.S. Pat. Nos. 4,450,097, 5,026,550 and 5,256,700.

The process of this invention is superior to the first type of prior art processes involving extraction with base, because, among other things, aqueous base is a poor extraction solvent. Aqueous base gives poor recovery and poor selectivity for carnosic acid. In addition, it has been found that materials recovered at a pH higher than 10 actually accelerate oxidation of molecules rather than inhibit that process. In contrast, the use of acetone in accordance with the present invention gives excellent recovery and excellent selectivity (up to 30% carnosic acid of the extracted solids).

The process of the present invention is also superior to the second type of prior art processes, i.e., those using liquid/liquid extraction, because it is selective for carnosic acid. Carnosic acid has been identified as the major phenolic diterpene naturally present in fresh rosemary. Also, as noted earlier, carnosic acid has a much greater antioxidant activity than other phenolic diterpenes present in rosemary extracts. Thus, there is a preference for the production of carnosic acid, if it can be accomplished economically.

In contrast, the liquid/liquid extraction processes of the prior art do not isolate carnosic acid. U.S. Pat. No. 4,450, 097, for example, discloses a process in which rosemary is extracted with a non-polar solvent followed by a liquid/liquid extraction with an aqueous base. However, the product of this process is rosmanol, See FIG. 2, a different antioxidant component of the spice, which is found naturally in much lower concentrations in the plant than carnosic acid. This process is not selective for carnosic acid, because, unless a quite non-polar extraction solvent is used (hexane), carnosic acid partitions into the organic over the aqueous base. Indeed, any solvent sufficiently non-polar for carnosic acid to preferentially partition into will be sufficiently non-polar as to be a poor extraction solvent.

Finally, the process of the present invention produces a superior product of highly concentrated carnosic acid which is essentially odorless, flavorless and colorless.

It is an object of this invention to provide a simple and efficient method for isolating and purifying carnosic acid suitable as an antioxidant from carnosic acid containing plant matter, such as rosemary and sage.

It is a further object of the invention to produce carnosic acid extract from plant matter, such as rosemary and sage, suitable for use as an antioxidant food additive and which does not have undesirable flavor, odor or color characteristic of these spices.

Other objects and attributes of the invention will be apparent from the detailed description of the invention set forth herein.

BRIEF DESCRIPTION OF THE DRAWING

The accompanying drawings, which are incorporated in and for a part of the specifications, illustrate the preferred embodiments of the present invention, and together with the description serve to explain the principles of the invention. In the Drawings.

DETAILED DESCRIPTION OF THE INVENTION AND THE PREFERRED EMBODIMENT

Figure 1:
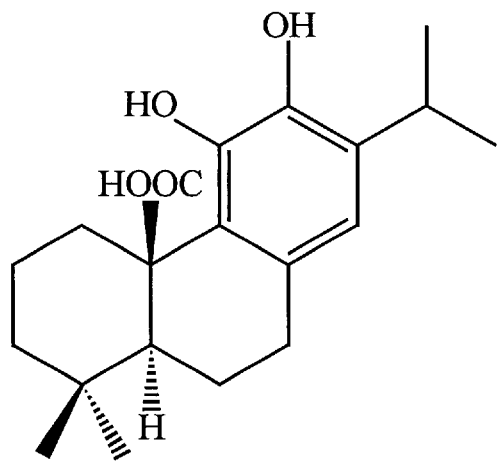
FIG. 1 provides the structural formula for carnosic acid, the primary diterpene antioxidant in the product of the present invention.
Figure 2:
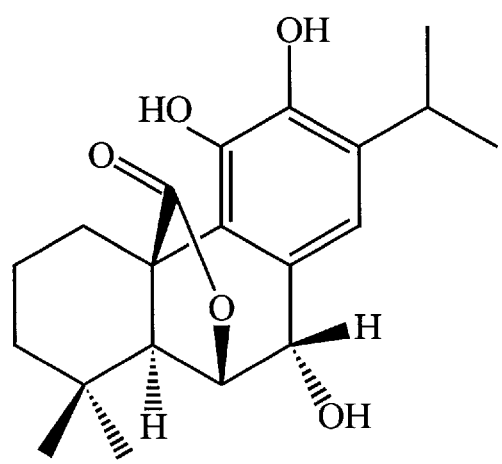
FIG. 2 provides the structural formula for rosmanol, a secondary diterpene antioxidant component of rosemary.

*Rosmarinus officinalis* is known to contain several diterpene catechol antioxidants, principally carnosic acid. We have found that carnosic acid can be significantly purified from water-miscible solvent (especially acetone) extracts of rosemary leaves by pH-controlled precipitation using water as a forcing solvent. This method exploits the fact that some salts of carnosic acid (e.g., sodium and ammonia) are significantly more water soluble than is carnosic acid.

This technique entails adding a base, such as sodium carbonate, in sufficient quantity to deprotonate the carnosic acid and make the carnosic acid salt. The actual quantity of base added can vary depending on the purity of the carnosic acid desired in the final product. While maintaining an alkali pH in the range of approximately 7 to less than 10 and preferably, approximately 8.6 to 9, water is added to cause the precipitation of a significant proportion of the impurities. These impurities are then removed by appropriate means (e.g., filtration or centrifugation). The carnosic acid salt remains in solution. After these precipitated impurities are removed, the aqueous solution is subjected to either a distillation, such as vacuum steam distillation, to remove a portion of the solvent and the odor causing contaminants, or alternatively a liquid/liquid extraction with a nonpolar solvent to extract such contaminants. The solution is then acidified producing a highly purified carnosic acid product which precipitates and can be removed by appropriate means (e.g., filtration or centrifugation).

The process of the present invention can be employed on any known plant matter or "biomass" containing an appreciable amount of carnosic acid. Rosemary and sage are preferred starting materials, because they contain a significant amount of carnosic acid and exist in sizable populations in the wild readily available for harvesting.

As noted previously, both rosemary and sage also have individual characteristics of odor, flavor and color which make them desirable spices. However, the pungent odor and flavor of these spices must not carry through into the antioxidant extract if that extract is to be of general utility in foods and many other antioxidant applications. Accordingly, any process for preparing a universally accepted antioxidant from rosemary or sage must minimize any residual odor, flavor or color characteristics of the spice.

The odor of these spices is at least partly associated with a mixture of monoterpenes including camphor, alpha terpinine, 1,8-cineole, and endo borneol. These materials are generally contained in the natural oils of the plant. They may be removed prior to extraction or later as part of the process described herein. Deoiling prior to extraction can be accomplished by steam distillation followed by an extraction with hexane or by any conventional means known to one skilled in the art. The process of the present invention works equally well with natural, i.e., oil-containing, or deoiled rosemary and sage. However, the preferred plant material of the present invention is in the natural, i.e., oil-containing, condition, because it has been handled less and contains more of the carnosic acid antioxidant which is the desired end product.

The characteristic colors of rosemary and sage are generally due to the chlorophyll content of these plant materials. In addition, oxidation of the carnosic acid can also add color. The best way to prepare a color-free antioxidant from these plant materials is to avoid extracting the chlorophyll in the first place.

The process of the present invention minimizes undesirable color and odor in the carnosic acid product in several ways. First, acetone is a relatively selective solvent and minimizes extraction of chlorophyll from the plant matter. In addition, the process of the invention is substantially able to remove the odor by steam distillation or hexane extraction of the extract. Finally, avoiding heating of the process streams will prevent further color from being developed, for example, by oxidation of some of the carnosic acid.

The product of the present invention is highly concentrated carnosic acid that is essentially odorless, flavorless and colorless. In general, the solid product obtained prior to any recrystallization step typically contains at least 50% carnosic acid and usually at least 65% carnosic acid. The absence of odor in the carnosic acid product of the present invention is typified by the fact that residual monoterpenes (i.e., camphene, alpha-terpinene, alpha-pinene, endo-borneol, myrcene, camphor, beta-pinene, 1, 8-cineol, gamma-terpinene, terpine-4-ol, limonene and citronella) in the product do not individually exceed 100 ppm based on carnosic acid content and collectively do not exceed 200 ppm as measured by gas chromatography. Indeed, the product typically contains no more than 25 ppm of any individual monoterpene and collectively the content of monoterpenes does not exceed 40 ppm. The product is essentially colorless, in that a solution of the product dissolved in denatured ethanol at 1 mg/mL carnosic acid concentration typically has an absorptivity less than 0.4 (1 cm cell) at 415 nm. In addition to these qualities, the solid carnosic acid antioxidant products of the present invention are highly desirable in that they are generally free of rosemary degradation products and semi-synthetic products such as 12-methoxyrosmanol, carnosol, and 7-methoxyrosmanol which are frequently present in other antioxidants. Carnosic acid is the major diterpene present in the solid product. The product is also free of many of the undesirable solvents used in the prior art including, for example, methylene chloride, benzene and toluene.

The product described in the preceding paragraph may be further purified by crystallization as set forth herein. Crystallization further increases the concentration of the carnosic acid and removes impurities. As a result, a crystallized solid product can be obtained which has a carnosic content of more than 95% with impurities further reduced below the levels previously described.

In commercial applications, the solid antioxidants produced by this invention are incorporated in solvents, such as vegetable oil, which can then be dispersed in the food or other product. The products retain the qualities previously mentioned. When these solids are dissolved in a clear vegetable oil in an amount of 200 to 1000 ppm carnosic acid, the resulting solution is essentially clear and has minimal suspended solids.

Typically, the biomass starting material or preferred portions thereof, such as the leaves in the case of rosemary and sage, are unground. Nevertheless, these materials may be pulverized, ground or comminuted to a fine powder in order to maximize surface contact with the extraction media.

As used herein, the term "carnosic acid containing plant material" or "biomass" is intended to include any plant material containing a not insignificant amount of carnosic acid. This includes members of the Labiatae family, which embraces both rosemary and sage. The biomass can be used in natural, dried or deoiled form and may be in large pieces, such as leaves, or comminuted form.

According to the process of the present invention, the carnosic acid containing plant material, such as rosemary or sage leaves, is contacted with a water miscible solvent sufficient to put the carnosic acid containing soluble portion of the biomass into solution. The solvent must be able to solubilize carnosic acid and be water miscible. The more volatile the solvent, the better. Suitable solvents include, but are not limited to, acetone and ethanol. Methanol or isopropanol may also be used, but due to their toxicity, are generally unacceptable in preparing antioxidants for food applications. The biomass:solvent ratio should be at a minimum 200 L of extracting solvent to 100 kg of biomass.

Acetone is the preferred solvent, because of its selectivity. While it extracts all of the carnosic acid, it extracts less of the unwanted solids from the biomass than other solvents do. The degree of extraction of the carnosic acid is generally greater than 90%, while the carnosic acid purity in the solids of the extract is between 20% and 30%. Acetone extraction can be performed at room temperature or at elevated temperatures.

After extraction of the biomass into solution with a water miscible solvent, base is added to the extract in sufficient quantity to deprotonate the carnosic acid in the extraction media, producing a basic solution. Preferably, this is accomplished with an aqueous base, such as aqueous sodium carbonate, ammonium hydroxide, or sodium bicarbonate.

Additional water should be added to the solution so that large amounts of impurities are made nearly entirely insoluble, but the carnosic acid salt remains in solution. The water contains a small amount of EDTA to provide stability and sodium sulfate to aid in flocculation of the precipitated solid impurities. During this process, the pH of the solution should be maintained in the range of approximately 7 to less than 10 and preferably, approximately 8.6 to 9. Water may be added in a buffer solution, such as aqueous sodium carbonate and sodium bicarbonate, or ammonium hydroxide may be added so that the pH of the solution is kept within the desired range.

The soluble carnosic acid and the insoluble impurities are then separated by any conventional means, such as filtration or centrifugation.

In one embodiment, the solution, free of solids, is then steam distilled to remove the residual extracting solvent. At this point, the volatile compounds associated with the odor and taste of the spice are dissipated with the steam. Alternatively, these oils can be removed by liquid/liquid extraction of the same basic solution with a sufficiently nonpolar solvent, such as hexane, so that the undesirable taste and odor molecules partition into the organic phase, but the carnosic acid salt remains in the aqueous phase.

In either case after the odor removal, the resulting solution is then acidified to precipitate the carnosic acid. Suitable acids for this purpose include, but are not limited to, phosphoric acid, sulfuric acid and glacial acetic acid. Preferably, the pH is adjusted to the range of between approximately 2.0 to 2.5. A highly purified carnosic acid product precipitates and can be removed by appropriate means (e.g., filtration or centrifugation). This solid product has the qualities described previously.

This product may be further purified through crystallization, producing product purities generally above 90%. In the preferred method crystallization is accomplished by dissolving the solids in a moderately polar aprotic solvent, such as acetone, and mixing that solution with sufficient nonpolar alkane solvent. The alkane solvent may include hexanes, heptanes, pentanes or octanes. This induces formation of solids and an oil layer which contain little carnosic acid and which are removed by decanting and filtration to produce a clear solution. That solution is chilled to produce crystalline carnosic acid. This crystallization process is illustrated in Example 2. Other crystallization procedures may be employed within the knowledge of one skilled in the art.

The novel process and products of our invention are illustrated by the following examples:

EXAMPLES

Materials and Methods

All solvents and reagents employed in the examples were technical grade as received from the manufacturer.

The biomass starting material, such as rosemary or sage leaves, may be in their natural oil-containing state or have been deoiled to remove the odor and taste associated with the spice.

The method for determining carnosic acid purity is an HPLC analysis. The HPLC system consisted of a Model L-6200 pump, a Model AS-4000 autosampler equipped with a 100-$\mu$l loop and a Model L-4500A diode array detector, all from Hitachi Instruments, Fremont, Calif. For the selective detection of readily oxidizable analytes, the system also was equipped with an LC-4B amperometric detector from Bioanalytical Systems, W. Lafayette, Ind., set with an applied voltage of +0.8V. The HPLC system was equipped with a 486 computer and DAD System Manager HPLC software, the latter also being supplied by Hitachi. The column was a 4.60mm×25-cm Hypersil ODS, 5μ from Alltech Associates, Deerfield, Ill. The column was run at either 2 mL/min or 1.5 mL/min with a 65:35 or 75:25 mixture of acetonitrile and water containing 0.5% phosphoric acid and 1 mM EDTA. The sample in alcohol (10μL) was injected on the column and the primary detection wavelength used was 230 nm.

The final products contained isolated carnosic acid at greater than 70% purity, if extracted from rosemary, while greater than 40% purity, if extracted from sage. The products were pale-yellow to tan in color, with a mild flavor, reminiscent of rosemary, but significantly less flavorful than the original spice. The products were either odorless or, according to some, have a slight tea-like odor.

Example 1

Whole natural, i.e., oil-containing, rosemary leaves (100 Kg) were extracted with 220 L of room temperature acetone for 36 hours and concentrated under a vacuum of 50–350 mm. Hg. to 120 L. The extract contained 2.6 kg of carnosic acid. Approximately 16 L of aqueous sodium carbonate containing 2.5 equivalents of base per equivalent of carnosic acid was added to the extract mixture slowly with stirring. Then 600 L of DI water containing 300 grams of EDTA was added into the basic extract, maintaining a pH of 8.7–9.0. A dark green precipitate formed and was removed by centrifugation and decantation. The 740 L of filtrate was then distilled under vacuum at approximately 700° and between 9 and 10 psi, removing 100 L of acetone and 190 L of water. The resulting solution was acidified with 10% phosphoric acid to a pH of 2.2. A cream-colored precipitate was formed. The precipitate was separated from the filtrate by centrifugation and decantation and then air dried. The final product (2.75 Kg) had a carnosic acid purity of 71% by weight and had the following levels of monoterpenes based on carnosic acid content: 5.6 ppm myrcene, 5.6 ppm alpha-terpine, 12.6 ppm 1, 8 cineole, 7 ppm camphor and 1.4 ppm endo-borneol. The absorptivity (1 cm cell) at 415 nm of the product dissolved in denatured alcohol was 0.4 per 1 mg carnosic acid/mL solution.

Example 2

An acetone extract of 5.2 kg. of natural, oil-containing rosemary leaves was concentrated in vacuo, i.e., 100 mm Hg., filtered, and precipitate washed, yielding 3.05 L of concentrated extract. Sufficient saturated aqueous sodium bicarbonate (90 g/L) was added to the extract to bring the pH between 8.5 and 9. Nine volumes of an aqueous sodium bicarbonate solution (9 g/L; pH 8.5) were combined with one volume of the basic extract. This mixture was filtered. The resulting clear filtrate was acidified with glacial acetic acid to a pH less than 3. The solid product was collected by decantation and filtration.

The collected solids (41 grams of carnosic acid at 75% by weight purity) were air dried and then redissolved in acetone. A portion of this acetone solution (90 mL containing 25.2 g carnosic acid) was added to 800 mL of room temperature hexane. The insoluble solids were removed by filtration and the volume of the remaining solution was reduced to 700 mL induced an oil layer to form which contained little carnosic acid. The solution was decanted and filtered to remove this oil. The now clear solution was chilled and the volume further reduced to about 350 mL over 48 hours. Crystals were collected by filtration, yielding 19.4 g of 95% pure carnosic acid, which was pale yellow in color, with very little odor or taste. The product contained the following monoterpene levels based on carnosic acid content: 4.3 ppm alpha-terpinene, 8.5 ppm 1, 8 cineole, 14.4 ppm camphor, 7.4 ppm endo borneol. The absorptivity (1 cm cell) at 415 nm of the product dissolved in denatured alcohol was 0.06 per 1 mg carnosic acid/mL solution.

Example 3

Whole natural, i.e., oil-containing, rosemary leaves (5320 g) were extracted three times with 15.9 L of hot acetone and the filtrates from each were recovered, combined, and taken to 3.5 L by evaporation in vacuo, i.e., 100 mm Hg. The resulting concentrate was diluted with 0.1 L of 0.1 $\underline{M}$ EDTA solution and 300 mL of aqueous sodium carbonate (90 g/L) to bring the solution to a pH between 8.5 and 9.

A second solution was prepared from 3.5 L saturated sodium sulfate and 28 L DI water plus sufficient sodium bicarbonate to bring the total solution to a pH of 8.9.

The buffer was poured slowly (over about 10 minutes) into the concentrated extract with vigorous stirring. An oil precipitated which was removed by filtration. The resulting filtrate was then extracted two times with 4 L of heptane, to remove the components which cause the objectionable color and taste. The heptane was set aside and the aqueous layer was acidified with concentrated phosphoric acid to a pH of 4.9. A gummy solid formed which floated on the solution. These solids were collected by filtration and then dissolved in 500 mL of methanol and acetone, the solution evaporated to dryness, and the total solids were placed in a vac oven for complete drying. The tan product was about 75% carnosic acid and had a low level of flavor and odor.

Example 4

10.3 Kg of natural, i.e., oil-containing, sage leaves were ground and extracted in 30L of acetone at 55°. 600 mL of this extract containing 15.36 grams of carnosic acid were removed and 90 mL (3.3 equivalents to 1 equivalent of carnosic acid) of sodium carbonate was added slowly with stirring. Three liters of DI water containing 8 g/L sodium sulfate and 0.5 mL of saturated EDTA were slowly added to the basic extract, producing a sticky mass of solid impurities. This material was filtered out of the solution. The solution was then steam distilled under vacuum which removed 1.1 L of solution which contained the acetone and the odor compounds. The condensed filtrate was then acidified with phosphoric acid until a pH of 2–2.5 was reached. A fine precipitate formed in the solution and was collected by filtration. The recovered product was air-dried producing 23.3 grams of dry solids containing 48.5% carnosic acid by weight, with a light brown color and a slight odor characteristic of sage.

Example 5

An acetone extract of 5.2 kg of natural, oil-containing rosemary leaves was concentrated in vacuo, i.e., 100 mm Hg., filtered and precipitate washed, yielding 3.05 L of concentrated extract. Aqueous sodium carbonate (90 g/L) was added to 50 mL of this extract at a ratio of 2.5 equivalents of base to 1 equivalent of carnosic acid. Eight volumes of DI water containing 0.01M EDTA were combined with one volume of the basic extract. This mixture was filtered. The resulting clear filtrate was distilled under vacuum between 130 and 160 mbars pressure, reducing the volume of the solution by 31%. The solution was acidified with concentrated phosphoric acid to a pH of 2, producing a creamy precipitate. The solid product was collected by filtration and air dried. The final product (2.3 grams) had a carnosic acid purity of 67.7% by weight. The product contained no detectable levels of monoterpenes. The absorptivity (1 cm cell) at 415 nm of the dissolved product in denatured alcohol was 0.16 per 1 mg carnosic acid/mL of solution.

The description and examples set forth herein are intended to illustrate representative embodiments of the invention. The claims which follow are not intended to be limited to the specific disclosed embodiments. The invention is susceptible to modifications, variations and changes including, without limitation, those known to one of ordinary skill in the art without departing from the proper scope or fair meaning of the following claims.

We claim:

1. A process for the extraction and isolation of a carnosic acid concentrate from carnosic acid containing plant matter comprising:

contacting the carnosic acid containing plant matter with a water-miscible solvent to form a carnosic acid containing plant extract;

adjusting the pH of the plant extract to a level in the range of approximately 7 to less than 10;

adding water to the plant extract in an amount sufficient to cause precipitation of impurities while retaining the carnosic acid salt in solution;

separating the impurities from the carnosic acid solution;

acidifying the aqueous solution to precipitate a highly purified carnosic acid concentrate; and removing the carnosic acid concentrate from the solution.

2. The process of claim 1 in which the plant material is selected from the Labiatae family.

3. The process of claim 1 in which the plant material is selected from the group consisting of rosemary and sage.

4. The process of claim 1 in which the water-miscible solvent is selected from the group consisting of acetone, ethanol, methanol or isopropanol.

5. The process of claim 1 in which the water-miscible solvent is acetone.

6. The process of claim 1 in which the pH is adjusted to the range of approximately 7 to less than 10 by the addition of sufficient sodium carbonate, ammonium hydroxide, sodium bicarbonate or mixtures thereof, to deprotonate the carnosic acid and produce the carnosic acid salt.

7. The process of claim 1 in which the pH is adjusted to the range of approximately 8.6 to 9.

8. The process of claim 1 in which the pH is adjusted to the range of approximately 8.6 to 9 by the addition of sufficient sodium carbonate, ammonium hydroxide, sodium bicarbonate or mixtures thereof, to deprotonate the carnosic acid and produce the carnosic acid salt.

9. The process of claim 1 in which the carnosic acid impurities are separated by a process selected from the group consisting of filtration or centrifugation.

10. The process of claim 1 in which the water added to the plant extract contains EDTA and sodium sulfate.

11. The process of claim 1 in which the carnosic acid containing plant matter has been treated to remove the compounds responsible for the taste and odor of the plant matter prior to contacting the plant matter with the water-miscible solvent.

12. The process of claim 1 further including the step of removing the compounds responsible for the taste and odor of rosemary or sage following the step of removing the impurities from the carnosic acid solution and prior to the acidifying step.

13. The process of claim 12 in which the compounds causing the objectionable taste and odor are removed by distillation, including vacuum steam distillation, or liquid/liquid extraction with a nonpolar solvent such as hexane or heptane.

14. The process of claim 1 including the additional steps of crystallizing the carnosic acid concentrate to produce purified carnosic acid.

15. A process for the extraction and isolation of a carnosic acid concentrate from carnosic acid containing plant matter of the Labiatae family comprising:

contacting the carnosic acid containing plant matter with a water-miscible solvent selected from the group consisting of acetone, ethanol, methanol or isopropanol to form a carnosic acid containing plant extract;

adjusting the pH of the plant extract to a level in the range of approximately 7 to less than 10;

adding water to the plant extract in an amount sufficient to cause precipitation of impurities while retaining the carnosic acid salt in solution;

separating the impurities from the carnosic acid solution;

removing the compounds responsible for the taste and odor of the plant matter;

acidifying the aqueous solution to precipitate a highly purified carnosic acid concentrate; and removing the carnosic acid concentrate from the solution.

16. The process of claim 15 in which the carnosic acid containing plant matter is selected from the group consisting of rosemary and sage.

17. The process of claim 15 in which the compounds causing the objectionable taste and odor are removed by distillation, including vacuum steam distillation, or liquid/liquid extraction with a nonpolar solvent such as hexane or heptane.

18. The process of claim 15 including the additional steps of:

dissolving the carnosic acid concentrate in a volatile, moderately polar aprotic solvent to form a solution;

mixing this solution with sufficient nonpolar alkane solvent to form insoluble impurities;

reducing the volume of the solution;

removing the insoluble impurities from the solution; and chilling the solution to crystalize pure carnosic acid.

19. The process of claim 18 in which the volatile, mildly aprotic solvent is selected from the group consisting of ether and acetone.

20. The process of claim 18 in which the alkane solvent is selected from the group consisting of pentane, hexane, heptane and octane.

21. The process of claim 15 in which the water-miscible solvent is acetone.

22. The process of claim 15 in which the pH is adjusted to the range of approximately 7 to less than 10 by the addition of sufficient sodium carbonate, ammonium hydroxide, sodium bicarbonate or mixtures thereof, to deprotonate the carnosic acid and produce the carnosic acid salt.

23. The process of claim 15 in which the pH is adjusted to the range of approximately 8.6 to 9.

24. The process of claim 23 in which the pH is adjusted to the range of approximately 8.6 to 9 by the addition of sufficient sodium carbonate, ammonium hydroxide, sodium bicarbonate or mixtures thereof, to deprotonate the carnosic acid and produce the carnosic acid salt.

25. The process of claim 15 in which the carnosic acid impurities are separated by a process selected from the group consisting of filtration or centrifugation.

26. The process of claim 15 in which the water added to the plant extract contains EDTA and sodium sulfate.

27. A process for the extraction and isolation of a carnosic acid concentrate from plant material selected from the group consisting of rosemary and sage comprising:

contacting the plant matter with acetone to form a carnosic acid containing plant extract;

adjusting the pH of the plant extract to the range of approximately 7 to less than 10;

adding water to the plant extract in an amount sufficient to cause precipitation of impurities while retaining the carnosic acid salt in solution;

separating the impurities from the carnosic acid solution;

removing the compounds responsible for the taste and odor of rosemary or sage by vacuum steam distillation;

acidifying the aqueous solution to precipitate a highly purified carnosic acid concentrate;

removing the carnosic acid concentrate from the solution;

crystallizing the carnosic acid concentrate to form purified carnosic acid.

28. The process of claim 27 in which the compounds causing the objectionable taste and odor are removed by distillation, including vacuum steam distillation, or liquid/liquid extraction with a nonpolar solvent such as hexane or heptane.

29. The process of claim 27 in which the pH is adjusted to the range of approximately 7 to less than 10 by the addition of sufficient sodium carbonate, ammonium hydroxide, sodium bicarbonate or mixtures thereof, to deprotonate the carnosic acid and produce the carnosic acid salt.

30. The process of claim 27 in which the pH is adjusted to the range of approximately 8.6 to 9.

31. The process of claim 27 in which the pH is adjusted to the range of approximately 8.6 to 9 by the addition of sufficient sodium carbonate, ammonium hydroxide, sodium bicarbonate or mixtures thereof, to deprotonate the carnosic acid and produce the carnosic acid salt.

32. The process of claim 27 in which the carnosic acid impurities are separated by a process selected from the group consisting of filtration or centrifugation.

33. The process of claim 27 in which the water added to the plant extract contains EDTA and sodium sulfate.

* * * * *